United States Patent
Umezawa

(10) Patent No.: US 9,754,199 B2
(45) Date of Patent: Sep. 5, 2017

(54) IMAGE FORMING APPARATUS FOR DETERMINING WHICH USERS ARE NOTIFIED THAT AN ERROR HAS OCCURRED

(71) Applicant: KYOCERA Document Solutions Inc., Osaka (JP)

(72) Inventor: Hideo Umezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 15 days.

(21) Appl. No.: 14/924,094

(22) Filed: Oct. 27, 2015

(65) Prior Publication Data

US 2016/0125280 A1    May 5, 2016

(30) Foreign Application Priority Data

Oct. 30, 2014  (JP) .................................. 2014-221009

(51) Int. Cl.
G06K 15/00      (2006.01)
G06F 3/12       (2006.01)

(52) U.S. Cl.
CPC .......... *G06K 15/408* (2013.01); *G06F 3/121* (2013.01); *G06F 3/1229* (2013.01); *G06F 3/1234* (2013.01); *G06F 3/1285* (2013.01); *G06K 15/402* (2013.01); *G06K 15/007* (2013.01)

(58) Field of Classification Search
CPC .. G06K 15/408; G06K 15/402; G06F 3/1234; G06F 3/1235; G06F 3/121
See application file for complete search history.

(56) References Cited

U.S. PATENT DOCUMENTS

2010/0238479 A1\* 9/2010 Yamazaki .......... H04N 1/32609
358/1.14

FOREIGN PATENT DOCUMENTS

JP           2000-235472 A      8/2000

\* cited by examiner

*Primary Examiner* — Benjamin O Dulaney
(74) *Attorney, Agent, or Firm* — Stein IP, LLC

(57) ABSTRACT

Provided is an image forming apparatus configured to: set, when an error occurs, a user who has a shorter take-away time than a user of a data transmission source as an additional notification destination; and transmit an error occurrence notification to the additional notification destination as well, and further configured to, when the take-away time of the user of the additional notification destination has elapsed since the error occurrence notification is transmitted to the additional notification destination without an error elimination operation being conducted: set a user who has a shorter take-away time than a time obtained by subtracting the take-away time of the user of the additional notification destination from the take-away time of the user of the data transmission source, as a new additional notification destination; and transmit the error occurrence notification to the new additional notification destination.

9 Claims, 6 Drawing Sheets

FIG.3

| | TAKE-AWAY TIME |
|---|---|
| USER A | CT1 (0.2 MINUTE) |
| USER B | CT2 (0.6 MINUTE) |
| USER C | CT3 (0.8 MINUTE) |
| USER D<br>DATA TRANSMISSION SOURCE | CT4 (1.5 MINUTES) |
| USER E | CT5 (2.0 MINUTES) |

IMAGE FORMING APPARATUS FOR DETERMINING WHICH USERS ARE NOTIFIED THAT AN ERROR HAS OCCURRED

INCORPORATION BY REFERENCE

This application is based upon and claims the benefit of priority from the corresponding Japanese Patent Application No. 2014-221009 filed on Oct. 30, 2014, the entire contents of which are incorporated herein by reference.

BACKGROUND

The present disclosure relates to an image forming apparatus configured to print an image on paper.

An image forming apparatus such as a printer includes a communication unit, a printing unit, and other units. The communication unit receives print data from a user. After the communication unit receives the print data from the user, the printing unit prints an image on paper based on the print data (executes a print job).

With this configuration, when an error such as a jam or a toner shortage occurs during execution of the print job, the printing unit suspends the print job until the error is eliminated. In this case, even when the communication unit receives new print data, the printing unit does not execute the print job based on the new print data. Therefore, as the suspended state of the print job continues longer, a period during which the print job is not executable becomes longer, which impairs the user's convenience. For that reason, when an error occurs during the execution of the print job, the communication unit transmits an error occurrence notification to a data transmission source of the print data, and prompts the user of the data transmission source to conduct an error elimination operation.

However, the user of the data transmission source may take time to reach the image forming apparatus depending on an installation position of the image forming apparatus, which may delay a timing for the user of the data transmission source to start the error elimination operation. Accordingly, hitherto, when an error occurs during the execution of the print job, the error occurrence notification may be transmitted to a user located at the shortest distance from the image forming apparatus as well as to the data transmission source.

SUMMARY

An image forming apparatus according to the present disclosure includes a printing unit, an ejection tray, an ejection detection unit, a communication unit, and a storage unit. The printing unit is configured to execute a print job for printing an image on paper based on print data, and suspend, when an error occurs during execution of the print job, the print job until the error is eliminated. The ejection tray is configured to receive ejection of printed paper on which the image has been printed by the printing unit. The ejection detection unit is configured to detect whether or not the printed paper has been taken away from the ejection tray based on an output from an ejection detection sensor configured to change the output depending on whether the printed paper is present or absent on the ejection tray. The communication unit is configured to receive the print data, transmit a job completion notification indicating completion of the print job to a data transmission source that is a transmission source of the print data, and transmit, when the error occurs during the execution of the print job, an error occurrence notification to the data transmission source. The storage unit is configured to store, for each user, a take-away time which is a time set based on a time that is required after the communication unit transmits the job completion notification to the data transmission source until the ejection detection unit detects that the printed paper has been taken away and which is a time required after a user of the data transmission source receives the job completion notification until the user takes away the printed paper. Further, when the error occurs during the execution of the print job, the communication unit sets a user who has a shorter take-away time than the user of the data transmission source as an additional notification destination candidate, sets any one of the users among the additional notification destination candidates as an additional notification destination, and transmits the error occurrence notification to the additional notification destination as well as to the data transmission source. In addition, when the take-away time of the user of the additional notification destination has elapsed since the error occurrence notification is transmitted to the additional notification destination without an error elimination operation, which is an operation for eliminating the error, being conducted, the communication unit sets a user who has a shorter take-away time than a time obtained by subtracting the take-away time of the user of the additional notification destination from the take-away time of the user of the data transmission source and who is not set as the additional notification destination, as the additional notification destination candidate, sets any one of the users among the additional notification destination candidates as a new additional notification destination, and transmits the error occurrence notification to the new additional notification destination.

Further features and advantages of the present invention will become apparent from the description of embodiments given below.

BRIEF DESCRIPTION OF THE DRAWINGS

FIG. 3 is a diagram for showing an example of a take-away time of each of users of the multifunction peripheral according to the embodiment of the present disclosure.

DETAILED DESCRIPTION

An image forming apparatus according to an embodiment of the present disclosure is described by taking an example of a multifunction peripheral having a copier function, a printer function, and the like.

<Overall Configuration of Multifunction Peripheral>

Figure 1:
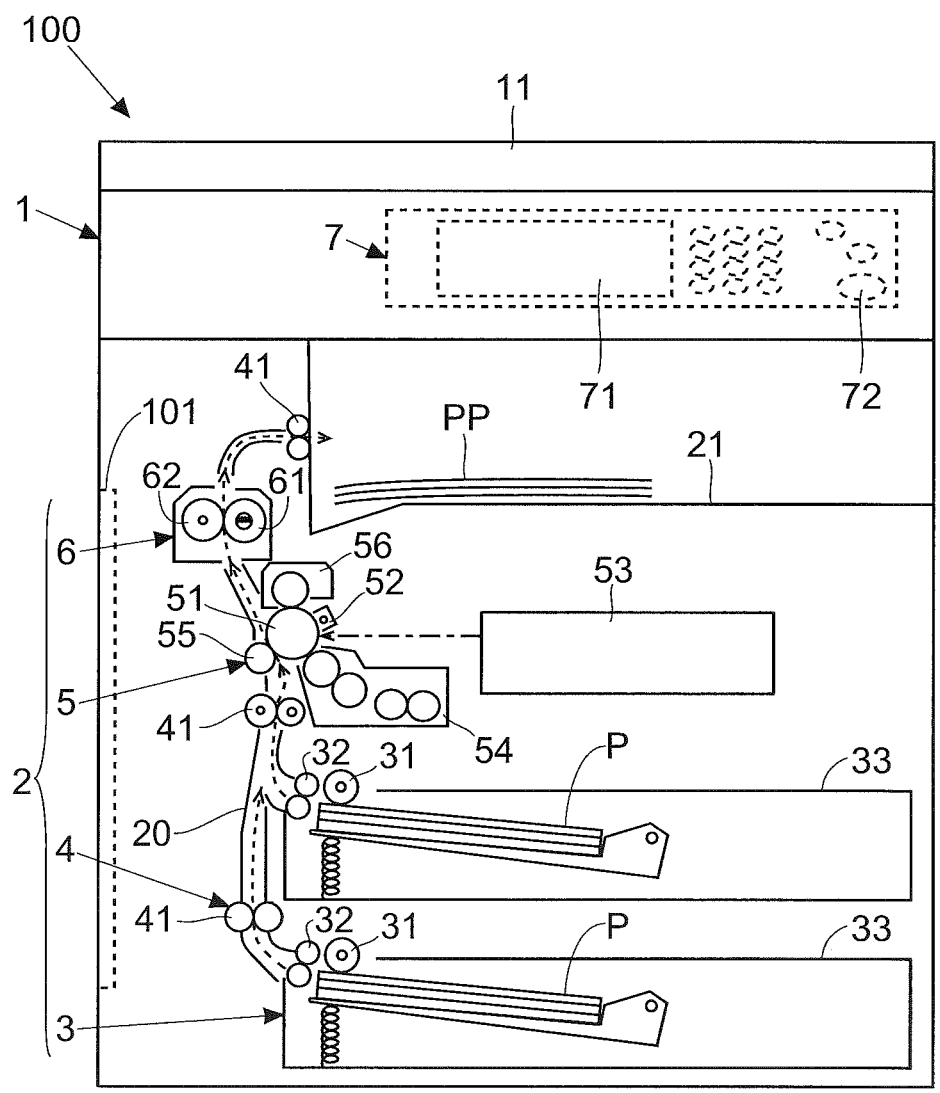
FIG. 1 is a schematic diagram for illustrating an example of a multifunction peripheral according to an embodiment of the present disclosure.

As illustrated in FIG. 1, a multifunction peripheral 100 (corresponding to "image forming apparatus") includes an image reading unit 1 and a printing unit 2. The image reading unit 1 reads an original and generates image data. The printing unit 2 prints an image on paper P to output the image (executes a print job) based on the image data obtained by reading the original with the image reading unit 1 or image data transmitted from a user terminal 200 illustrated in FIG. 2.

The printing unit 2 includes a paper feeding section 3, a paper conveying section 4, an image forming section 5, and a fixing section 6. The paper feeding section 3 includes a pickup roller 31 and a paper feeding roller pair 32, and feeds the paper P received in a paper cassette 33 to a paper conveying path 20. The paper conveying section 4 includes a plurality of conveying roller pairs 41, and conveys the paper P along the paper conveying path 20.

The image forming section 5 includes a photosensitive drum 51, a charging device 52, an exposure device 53, a developing device 54, a transfer roller 55, and a cleaning device 56. The image forming section 5 forms a toner image based on the image data, and transfers the toner image onto the paper P. The fixing section 6 includes a heating roller 61 and a pressure roller 62, and fixes the transferred toner image to the paper P through heating and pressurizing thereof.

The paper P that has passed through the fixing section 6 (printed paper PP on which the image has been printed by the printing unit 2) is conveyed by the paper conveying section 4 along the paper conveying path 20 as it is. Then, the printed paper PP is finally ejected onto an ejection tray 21.

Further, the multifunction peripheral 100 includes an operation/display unit 7. The operation/display unit 7 includes a liquid crystal display panel 71 provided with a touch panel. The liquid crystal display panel 71 displays software keys for receiving various settings and the like, messages, and the like. In addition, the operation/display unit 7 includes hardware keys 72 such as a numeric keypad and a start key.

<Hardware Configuration of Multifunction Peripheral>

Figure 2:
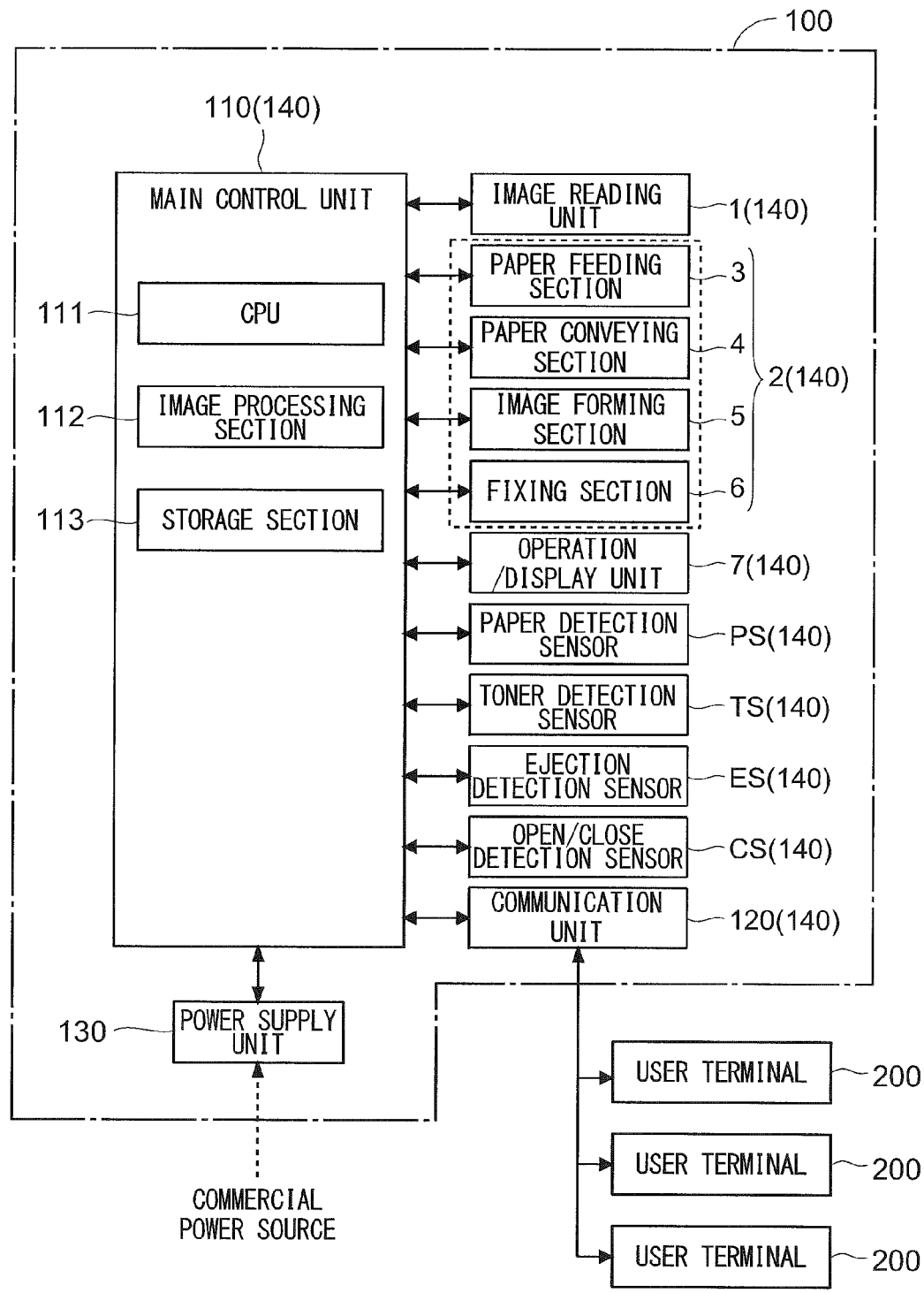
FIG. 2 is a block diagram for illustrating an example of a hardware configuration of the multifunction peripheral according to the embodiment of the present disclosure.

As illustrated in FIG. 2, the multifunction peripheral 100 includes a main control unit 110 connected to the image reading unit 1, the printing unit 2, and the like. The main control unit 110 includes a main CPU 111, an image processing section 112, and a storage section 113. The image processing section 112 is made up of an ASIC dedicated to image processing or the like, and subjects the image data to image processing (including enlargement, reduction, density conversion, and data format conversion). The storage section 113 is made up of a ROM, a RAM, or the like, and stores a program for control and data therefor.

Then, the main control unit 110 controls operations of the respective units of the multifunction peripheral 100, such as the image reading unit 1 and the printing unit 2, based on the program and the data that are stored in the storage section 113 (controls execution of the print job). Further, the main control unit 110 detects whether or not an error (such as a jam or a toner shortage) has occurred during the execution of the print job. When an error occurs during the execution of the print job, the main control unit 110 instructs the printing unit 2 to suspend the print job in execution.

As an example, the main control unit 110 detects whether or not a jam has occurred during the execution of the print job. The occurrence of the jam is detected based on outputs from a plurality of paper detection sensors PS arranged along the paper conveying path 20 illustrated in FIG. 1. Note that, the paper detection sensor PS is a sensor configured to change the output depending on whether the paper P is present or absent in a corresponding detection position.

In order to determine whether or not a jam has occurred, the main control unit 110 starts timekeeping after detecting that the paper P has reached the detection position of a given paper detection sensor PS (referred to as "first sensor") among the plurality of paper detection sensors PS. After a lapse of a predetermined time since the main control unit 110 detects that the paper P has reached the detection position of the first sensor, the main control unit 110 detects whether or not the paper P has reached the detection position of another paper detection sensor PS (referred to as "second sensor") arranged on a downstream side of the detection position of the first sensor along a paper conveying direction. When resultantly failing to detect that the paper P has reached the detection position of the second sensor, the main control unit 110 determines that a jam has occurred. The predetermined time used in this case represents a time which is required for the paper P to proceed from the detection position of the first sensor to the detection position of the second sensor and which may be calculated in advance based on a distance between the detection position of the first sensor and the detection position of the second sensor and a paper conveying speed.

Alternatively, the main control unit 110 determines that a jam has occurred when failing to detect a trailing edge of the paper P in the detection position of a given paper detection sensor PS among the plurality of paper detection sensors PS even after a lapse of a predetermined time since a leading edge of the paper P is detected in the same detection position. The predetermined time used in this case represents a time which is required after the leading edge of the paper P reaches the detection position of the given paper detection sensor PS until the trailing edge of the paper P passes through the same detection position and which may be calculated in advance based on a length of the paper P and the paper conveying speed.

As another example, the main control unit 110 detects whether or not a toner shortage has occurred during the execution of the print job. The occurrence of the toner shortage is detected based on an output from a toner detection sensor TS arranged in the developing device 54 illustrated in FIG. 1. Note that, the toner detection sensor TS is a sensor configured to change the output depending on a toner amount within the developing device 54.

In order to determine whether or not a toner shortage has occurred, the main control unit 110 detects the toner amount within the developing device 54 based on the output from the toner detection sensor TS. When the toner amount within the developing device 54 falls below a reference amount defined in advance, the main control unit 110 determines that a toner shortage has occurred (determines that the developing device 54 needs to be replenished with toner).

When an error such as a jam or a toner shortage described above occurs during the execution of the print job, the main control unit 110 suspends the print job in execution. Note that, the main control unit 110 restarts the print job when the error is eliminated after the print job is suspended.

In addition to the paper detection sensors PS and the toner detection sensor TS, sensors for various kinds of detection are connected to the main control unit 110. For example, an ejection detection sensor ES, an open/close detection sensor CS, and the like are connected to the main control unit 110.

The ejection detection sensor ES is a sensor configured to change an output depending on whether the printed paper PP is present or absent on the ejection tray 21 illustrated in FIG. 1. Based on the output from the ejection detection sensor ES, the main control unit 110 detects whether the printed paper PP is present or absent on the ejection tray 21. In other words, based on the output from the ejection detection sensor ES, the main control unit 110 detects whether or not the printed paper PP has been taken away from the ejection tray 21. In this configuration, the main control unit 110 corresponds to an "ejection detection unit".

The open/close detection sensor CS is a sensor configured to change an output depending on whether an apparatus cover 101 illustrated in FIG. 1 has been opened or closed. Based on the output from the open/close detection sensor CS, the main control unit 110 detects whether the apparatus cover 101 has been opened or closed. Note that, the apparatus cover 101 is installed on a front surface of the apparatus or a side surface of the apparatus so as to be able to be opened or closed, and an inside of the apparatus is exposed when the apparatus cover 101 is opened. For that reason, for example, when an error such as a jam or a toner shortage occurs, the apparatus cover 101 is opened in order to conduct an error elimination operation that is an operation for eliminating the error. Therefore, after the error occurs, the detection as to whether the apparatus cover 101 has been opened or closed allows the determination as to whether or not the error elimination operation has been conducted.

Further, the main control unit 110 controls a displaying operation of the operation/display unit 7, and detects an operation conducted with respect to the operation/display unit 7. For example, when an error occurs during the execution of the print job, the main control unit 110 displays on the operation/display unit 7 a message for informing that an error has occurred.

In addition, the multifunction peripheral 100 includes a communication unit 120 and a power supply unit 130 that are connected to the main control unit 110.

The communication unit 120 is communicably connected to the user terminal 200 (personal computer). When receiving an instruction from the main control unit 110, the communication unit 120 communicates to/from the user terminal 200. For example, the communication unit 120 receives print data including the image data from the user terminal 200. The print data includes not only the image data but also information on printing conditions for the print job and information on a transmission source of the print data (hereinafter referred to as "data transmission source").

Further, the communication unit 120 transmits a job completion notification indicating completion of the print job to the data transmission source. Note that, a transmission timing of the job completion notification is described later in detail. In addition, when an error occurs during the execution of the print job, the communication unit 120 transmits an error occurrence notification to the data transmission source. In this case, as described later in detail, the error occurrence notification may be transmitted to another user as well as to the data transmission source.

The power supply unit 130 is connected to a commercial power source, and generates a voltage required to operate the respective units of the multifunction peripheral 100. Then, the power supply unit 130 supplies power to the image reading unit 1, the printing unit 2, the operation/display unit 7, the main control unit 110, the communication unit 120, and the various sensors, collectively as a power-supplied unit. The respective units configured to operate by being supplied with power by the power supply unit 130 may be hereinafter referred to collectively as "power-supplied unit 140".

<Switching of Power Supply Mode>

The multifunction peripheral 100 is provided with a normal mode and a power-saving mode (sleep mode) as power supply modes. Note that, the normal mode represents a mode of normally supplying power to the power-supplied unit 140, while the power-saving mode represents a mode of restricting the power supply to the power-supplied unit 140 compared to the normal mode. Further, the power supply unit 130 switches the power supply mode depending on a state of the multifunction peripheral 100.

In the normal mode, the power supply unit 130 supplies power to an entirety of the power-supplied unit 140. On the other hand, when the power supply mode is shifted from the normal mode to the power-saving mode, the power supply unit 130 supplies power to only a part of the power-supplied unit 140, and suspends the power supply to the other part.

When a condition for a shift from the normal mode to the power-saving mode is satisfied, the main control unit 110 instructs the power supply unit 130 to shift the power supply mode from the normal mode to the power-saving mode. For example, when a time that has elapsed with the multifunction peripheral 100 left unused after the completion of the print job exceeds a threshold time defined in advance, the main control unit 110 determines that the condition for the shift has been satisfied, and shifts the power supply mode to the power-saving mode.

When receiving a recovery signal indicating a recovery condition for a recovery of the normal mode from the power-saving mode has been satisfied from a recovery condition detecting unit, the power supply unit 130 restarts the power supply to the entirety of the power-supplied unit 140 (recovers the normal mode from the power-saving mode). Note that, in order to receive the recovery signal from the recovery condition detecting unit, the power supply unit 130 continues the power supply to the recovery condition detecting unit even in the power-saving mode.

The operation/display unit 7 may be given as a part corresponding to the recovery condition detecting unit. For example, when receiving an operation in the power-saving mode, the operation/display unit 7 transmits the recovery signal to the power supply unit 130. Further, the communication unit 120 may serve as the recovery condition detecting unit. When receiving the print data from the user terminal 200 in the power-saving mode, the communication unit 120 transmits the recovery signal to the power supply unit 130. When receiving the recovery signal, the power supply unit 130 recovers the normal mode from the power-saving mode.

Further, the open/close detection sensor CS for detecting whether the apparatus cover 101 has been opened or closed may serve as the recovery condition detecting unit. In addition, although not shown, a sensor for detecting whether an original cover 11 illustrated in FIG. 1 has been opened or closed, a sensor for detecting whether the paper cassette 33 illustrated in FIG. 1 has been attached or detached, or the like may serve as the recovery condition detecting unit. That is, the power supply unit 130 recovers the normal mode from the power-saving mode when, in the power-saving mode, the apparatus cover 101 or the original cover 11 is opened or closed or the paper cassette 33 is attached or detached.

Note that, although not shown, when a human sensor (such as an infrared sensor) for detecting whether or not a user has approached the multifunction peripheral 100 is installed in the multifunction peripheral 100, the human sensor may be configured to function as the recovery condition detecting unit. That is, when the user approaches the multifunction peripheral 100 (when the user intends to use the multifunction peripheral 100) in the power-saving mode, the power supply unit 130 may determine that the recovery condition has been satisfied, and recover the normal mode from the power-saving mode.

<Notification Destination of Error Occurrence Notification>

When an error occurs during the execution of the print job, the main control unit 110 instructs the printing unit 2 to suspend the print job in execution. At this time, for example, even when the communication unit 120 receives new print data while the print job remains suspended, the print job based on the new print data is not executed. This causes inconvenience for the user who has transmitted the new print data. In addition, the power supply mode does not shift to the power-saving mode while the print job remains suspended, which causes such inconvenience that power is consumed wastefully.

In order to resolve such inconvenience, when an error occurs during the execution of the print job, the main control unit 110 instructs the communication unit 120 to transmit the error occurrence notification to the data transmission source. That is, the user of the data transmission source is prompted to conduct the error elimination operation. With this configuration, even when an error occurs during the execution of the print job, the multifunction peripheral 100 may be inhibited from being left in that state. However, when an installation position of the user terminal 200 of the data transmission source (seat of the user of the data transmission source) is far away from an installation position of the multifunction peripheral 100, a time required until the error elimination operation is conducted (time required for the user of the data transmission source to reach the multifunction peripheral 100) becomes long. That is, a long time may elapse while the print job remains suspended.

Therefore, when an error occurs during the execution of the print job, the main control unit 110 instructs the communication unit 120 to transmit the error occurrence notification to another user (hereinafter referred to as "additional notification destination") as well as to the data transmission source. However, when the user terminal 200 of the additional notification destination is farther away from the multifunction peripheral 100 than the user terminal 200 of the data transmission source, the user of the additional notification destination reaches the multifunction peripheral 100 later than the user of the data transmission source. In this case, even when the error occurrence notification is transmitted to the additional notification destination, the time required until the error elimination operation is conducted is not reduced.

For that reason, the main control unit 110 sets a take-away time of each user, and stores the take-away time in the storage section 113 for each user. In this configuration, the main control unit 110 corresponds to a "take-away time setting unit". In this case, the take-away time is obtained by setting, for each user, a time required for the user who has received the job completion notification to reach the multifunction peripheral 100 (which is described later in detail). That is, the user who has received the job completion notification reaches the multifunction peripheral 100 earlier as the take-away time of the user becomes shorter (later as the take-away time of the user becomes longer).

When instructing the communication unit 120 to transmit the error occurrence notification to the additional notification destination (when an error occurs during the execution of the print job), the main control unit 110 sets the take-away time of the user of the data transmission source as a remaining time. Further, the main control unit 110 sets a user who has a shorter take-away time than the remaining time set when the error occurs (take-away time of the user of the data transmission source) as an additional notification destination candidate. Note that, depending on the number of users who are accessing the multifunction peripheral 100, there may exist a plurality of additional notification destination candidates, or may exist no additional notification destination candidate. When there exists an additional notification destination candidate, the communication unit 120 sets any one of the users among the additional notification destination candidates as the additional notification destination, and transmits the error occurrence notification to the additional notification destination as well. For example, the communication unit 120 sets the user having a shortest take-away time among the additional notification destination candidates as the additional notification destination.

Figure 4:
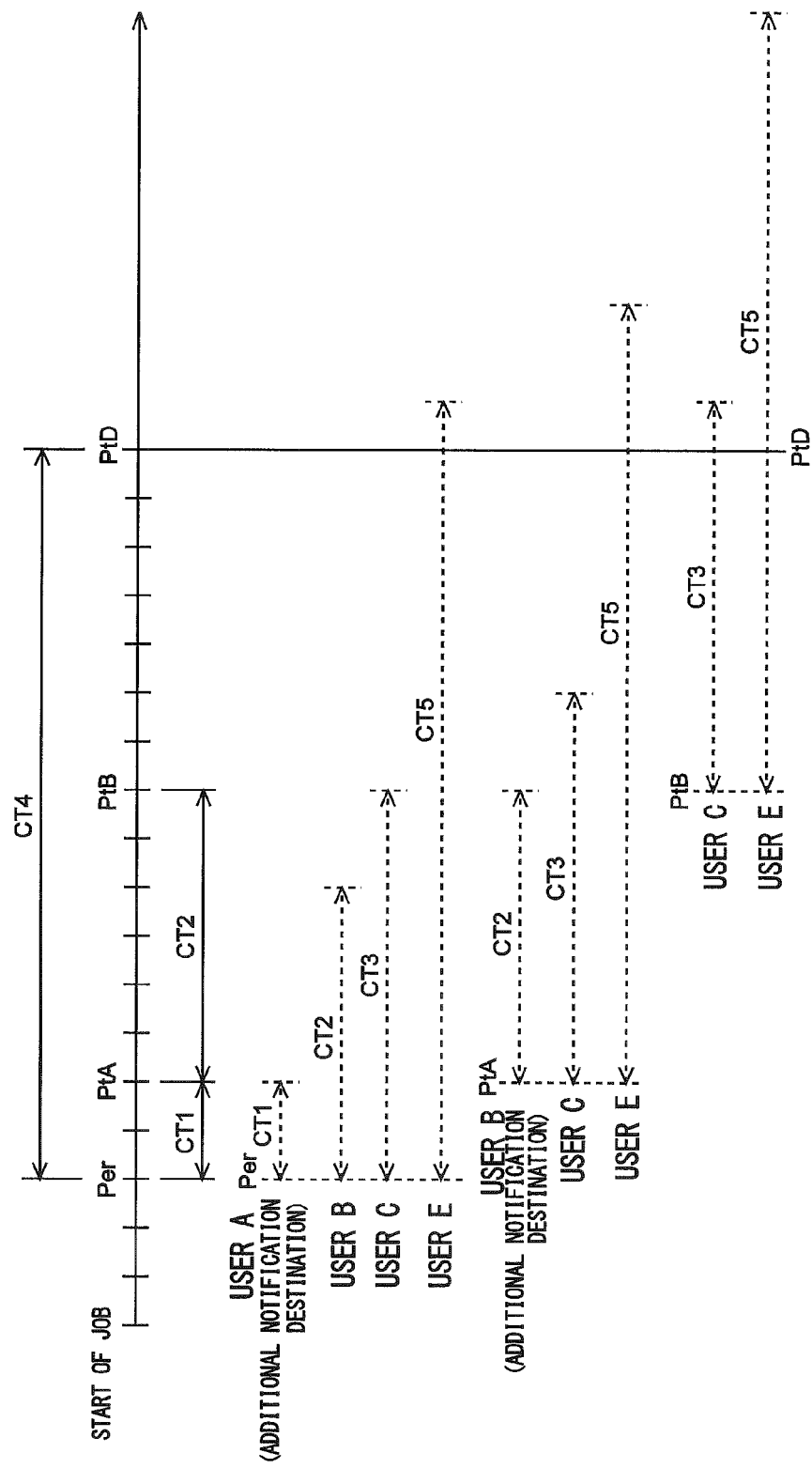
FIG. 4 is a timing chart for illustrating an example of a transmission timing of an error occurrence notification to an additional notification destination for the multifunction peripheral according to the embodiment of the present disclosure.

Now, a specific description is made with reference to FIG. 3 and FIG. 4 on the assumption that the respective user terminals 200 of users A to E are communicably connected to the multifunction peripheral 100 (communication unit 120).

First, as shown in FIG. 3, it is assumed that the users A to E have take-away times CT1 to CT5, respectively, and that the user D is the data transmission source. Note that, in the following description, (CT1 (0.2 minute))<(CT2 (0.6 minute))<(CT3 (0.8 minute))<(CT4 (1.5 minutes))<(CT5 (2.0 minutes)) for the sake of convenience.

In this case, as illustrated in FIG. 4, when an error occurs, the communication unit 120 transmits the error occurrence notification to the user D at a time point Per at which the error occurs. With this configuration, the user D is predicted to reach the multifunction peripheral 100 when a time point PtD, at which the take-away time CT4 of the user D has elapsed since the time point Per at which the error occurs, is reached.

At this time, the remaining time set by the main control unit 110 is 1.5 minutes corresponding to the take-away time CT4 of the user D. In this case, each of the take-away times CT1 to CT3 of the users A to C is shorter than the take-away time CT4 of the user D, while the take-away time CT5 of the user E is longer than the take-away time CT4 of the user D. Therefore, the main control unit 110 extracts the users A to C as the additional notification destination candidates. Then, the user having the shortest take-away time among the additional notification destination candidates is the user A, and hence the communication unit 120 sets the user A as the additional notification destination. That is, the communication unit 120 transmits the error occurrence notification to the user A as well as to the user D at the time point Per at which the error occurs. With this configuration, the user A is predicted to reach the multifunction peripheral 100 when a time point PtA, at which the take-away time CT1 of the user A has elapsed since the time point Per at which the error occurs, is reached.

When the error occurrence notification is transmitted to only the user D, the error elimination operation is conducted at the time point PtD at which 1.5 minutes (CT4) have elapsed since the time point Per at which the error occurs. However, when the error occurrence notification is transmitted to the user A as well with the result that the user A reaches the multifunction peripheral 100 at the time point PtA, the error elimination operation is conducted earlier by 1.3 minutes (CT4−CT1).

However, in some cases, the error elimination operation may not be conducted even at the time point PtA. For example, when the error occurrence notification is transmitted to the user A, in a case where the user A is away from his/her own user terminal 200 or other such case, the error elimination operation is not conducted even at the time point PtA.

Accordingly, when the take-away time of the user of the additional notification destination has elapsed since the error occurrence notification is transmitted to the additional notification destination without the error elimination operation being conducted, the main control unit 110 instructs the communication unit 120 to transmit the error occurrence notification to a new additional notification destination.

Note that, the main control unit 110 detects whether the apparatus cover 101 illustrated in FIG. 1 has been opened or closed, and when the apparatus cover 101 remains closed, determines that the error elimination operation has not been conducted. Further, the main control unit 110 may determine whether or not the error elimination operation has been conducted based on whether or not an operation has been conducted with respect to the operation/display unit 7. In addition, although not shown, when a human sensor is installed in the multifunction peripheral 100, the main control unit 110 may determine whether or not the error elimination operation has been conducted based on whether or not the user has approached the multifunction peripheral 100.

When instructing the communication unit 120 to transmit the error occurrence notification to the new additional notification destination, the main control unit 110 sets a time obtained by subtracting the take-away time of the user of the additional notification destination from the remaining time set when the error occurs (in this case, corresponding to the take-away time of the user of the data transmission source), as the remaining time. Further, the main control unit 110 extracts a user who has a shorter take-away time than the remaining time (time obtained by subtracting the take-away time of the user of the additional notification destination from the take-away time of the user of the data transmission source) and who is not set as the additional notification destination, as the additional notification destination candidate. When such an additional notification destination candidate exists, the communication unit 120 sets any one of the users among the additional notification destination candidates as the additional notification destination, and transmits the error occurrence notification to the new additional notification destination. For example, the communication unit 120 sets the user having the shortest take-away time among the additional notification destination candidates as the new additional notification destination.

Now, a specific description is made with reference to FIG. 3 and FIG. 4, on the assumption that the error elimination operation is not conducted even at the time point PtA at which the user A is predicted to reach the multifunction peripheral 100.

When the error elimination operation is not conducted even at the time point PtA, the remaining time is set by the main control unit 110, and the remaining time becomes 1.3 minutes (CT4–CT1). In this case, the users B, C, and E are not set as the additional notification destination. However, the take-away time CT5 of the user E is longer than the remaining time. Therefore, the main control unit 110 extracts the users B and C as the additional notification destination candidates. Then, the user having the shortest take-away time among the additional notification destination candidates is the user B, and hence the communication unit 120 sets the user B as a new additional notification destination. That is, the communication unit 120 transmits the error occurrence notification to the user B at the time point PtA. With this configuration, the user B is predicted to reach the multifunction peripheral 100 when a time point PtB, at which the take-away time CT2 of the user B has elapsed since the time point PtA, is reached.

In addition, when the take-away time of the user of the new additional notification destination has elapsed since the error occurrence notification is transmitted to the new additional notification destination without the error elimination operation being conducted, the main control unit 110 instructs the communication unit 120 to repeatedly set a new additional notification destination and transmit the error occurrence notification to the new additional notification destination.

At this time, the main control unit 110 sets a time obtained by subtracting a total time of the take-away times of the respective users that have already been set as the additional notification destinations from the remaining time set when the error occurs (in this case, corresponding to the take-away time of the user of the data transmission source), as the remaining time. Then, the main control unit 110 extracts a user who has a shorter take-away time than the remaining time (time obtained by subtracting the total time of the take-away times of the respective users that have already been set as the additional notification destinations from the take-away time of the user of the data transmission source) and who is not set as the additional notification destination, as the additional notification destination candidate. When such an additional notification destination candidate exists, the communication unit 120 sets any one of the users among the additional notification destination candidates as the additional notification destination, and transmits the error occurrence notification to the additional notification destination. For example, the communication unit 120 sets the user having the shortest take-away time among the additional notification destination candidates as the additional notification destination.

For example, in the example shown in FIG. 3 and illustrated in FIG. 4, when the error elimination operation is not conducted even at the time point PtB, the communication unit 120 sets a new additional notification destination, and transmits the error occurrence notification to the new additional notification destination.

In this case, the remaining time set by the main control unit 110 at the time point PtB becomes 0.7 minute (CT4–CT1–CT2). In this case, when there remains a user who has a shorter take-away time than the remaining time and is not set as the additional notification destination, any one of the remaining users is set as a new additional notification destination, and the error occurrence notification is transmitted to the new additional notification destination.

However, in the example shown in FIG. 3 and illustrated in FIG. 4, the users C and E remain without having been set as the additional notification destination, but each of the take-away times CT3 and CT5 of the users C and E is longer than the remaining time, and hence there exists no user that can be set as the additional notification destination candidate. Even when the error occurrence notification is transmitted to the user C or E at the time point PtB, a time point at which the user C or E who has received the error occurrence notification is predicted to reach the multifunction peripheral 100 is later than the time point PtD at which the user D of the data transmission source is predicted to reach the multifunction peripheral 100. For that reason, the communication unit 120 does not transmit the error occurrence notification at the time point PtB.

However, when the error elimination operation is not conducted even at the time point PtD at which the user D is predicted to reach the multifunction peripheral 100, the error occurrence notification may be transmitted to any one of the users C and E (for example, the user C having the shortest take-away time) at the time point PtD.

<Setting of Take-Away Time>

When the communication unit 120 receives the print data, the main control unit 110 determines whether or not the data transmission source is an unset user. Note that, the "unset user" represents a user for whom the take-away time is not set. In a case where the data transmission source is the unset user, when the print job based on the print data received from the data transmission source (unset user) is completed, the main control unit 110 instructs the communication unit 120 to transmit the job completion notification to the data transmission source (unset user). Then, the main control unit 110 sets the take-away time of the data transmission source (unset user) based on a time that has elapsed since the job completion notification is transmitted to the data transmission source (unset user) until the printed paper PP is detected to have been taken away.

Specifically, each time the printed paper PP is taken away after the completion of the print job based on the print data received from the unset user, the main control unit 110 acquires a time between a time point at which the job completion notification is transmitted to the unset user and a time point at which the printed paper PP is detected to have been taken away, as a setting-purpose time. When the number of acquired setting-purpose times corresponding to the unset user reaches a predetermined number (for example, 10 to 20), the main control unit 110 sets an average time obtained by averaging the predetermined number of setting-purpose times as the take-away time of the unset user. Alternatively, the main control unit 110 sets a shortest setting-purpose time among the predetermined number of setting-purpose times as the take-away time of the unset user.

However, when the number of acquired setting-purpose times reaches the predetermined number, the main control unit 110 obtains an absolute value of a deviation of each setting-purpose time (value obtained by subtracting the setting-purpose time from an average time). Then, the main control unit 110 inhibits the setting-purpose time having the absolute value of the deviation exceeding a threshold value (for example, several seconds to several tens of seconds) defined in advance from being used to set the take-away time.

Incidentally, when the communication unit 120 receives the print data, the main control unit 110 acquires the setting-purpose time corresponding to the user of the data transmission source even in a case where the take-away time of the user of the data transmission source has already been set. Then, the main control unit 110 updates the take-away time of the user of the data transmission source based on the currently-acquired setting-purpose time and the previously-acquired setting-purpose times. For example, the main control unit 110 excludes an earliest setting-purpose time among the previously-acquired setting-purpose times, and sets the take-away time based on the rest of the setting-purpose times (including the currently-acquired setting-purpose time).

Note that, although not shown, the multifunction peripheral 100 may be provided with a user authentication unit to conduct a user authentication, to thereby identify the user who has taken away the printed paper PP. For example, the user authentication unit includes a card reader configured to read user information from an ID card in a noncontact manner, and reads the user information from the ID card held by the user who has approached the multifunction peripheral 100 (user who intends to take away the printed paper PP), to thereby identify the user who has taken away the printed paper PP.

<Notification Timing of Job Completion Notification>

In a case where the user for whom the take-away time is not set is the data transmission source, when the print job is completed, the main control unit 110 instructs the communication unit 120 to transmit the job completion notification to the data transmission source. Then, the main control unit 110 sets the take-away time of the user based on a time that has elapsed since the job completion notification is transmitted to the data transmission source until the printed paper PP is taken away.

On the other hand, in a case where the user for whom the take-away time is set is the data transmission source, when the communication unit 120 receives the print data, the main control unit 110 predicts an expected job execution time which is required after start of the print job based on the print data until completion thereof. In this configuration, the main control unit 110 corresponds to a "time prediction unit". Further, the main control unit 110 determines whether or not the take-away time of the user of the data transmission source is shorter than the expected job execution time. When the take-away time of the user of the data transmission source is shorter than the expected job execution time, the main control unit 110 instructs the communication unit 120 to transmit the job completion notification to the data transmission source before the completion of the print job. Specifically, the communication unit 120 transmits the job completion notification to the data transmission source when a time (hereinafter referred to as "notification timing time") obtained by subtracting the take-away time of the user of the data transmission source from the expected job execution time has elapsed since the print job is started.

Figure 5:
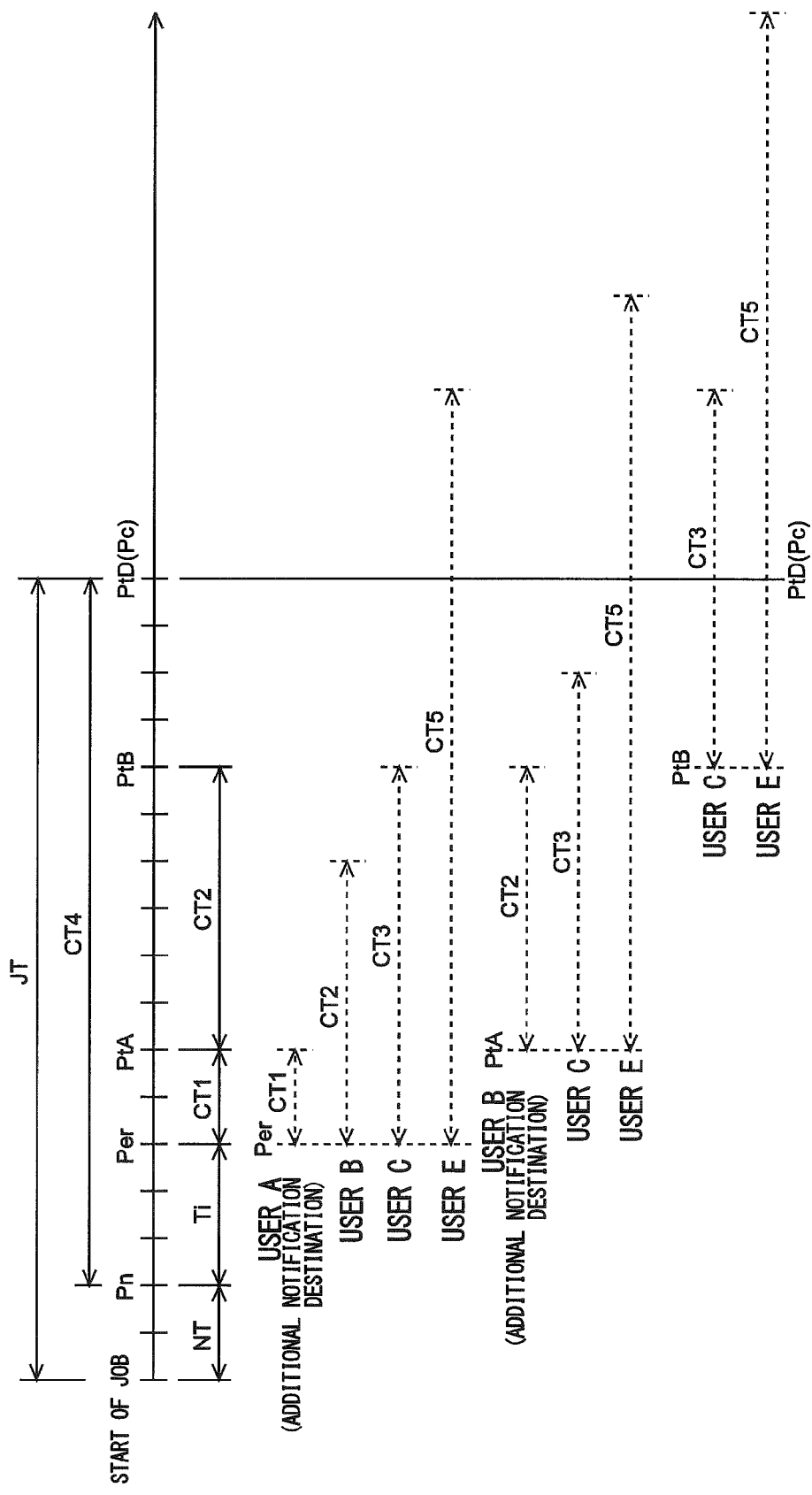
FIG. 5 is a timing chart for illustrating an example of the transmission timing of the error occurrence notification to the additional notification destination for the multifunction peripheral according to the embodiment of the present disclosure.

As an example, it is assumed that the user D among the users A to E shown in FIG. 3 is the data transmission source with the expected job execution time being 1.7 minutes. In this case, as illustrated in FIG. 5, the take-away time CT4 (1.5 minutes) of the user D is shorter than an expected job execution time JT (1.7 minutes), and hence the communication unit 120 transmits the job completion notification to the user D when a time point Pn at which a notification timing time NT (JT−CT4) has elapsed since the print job is started is reached. In other words, the communication unit 120 transmits the job completion notification to the user D 1.5 minutes before the print job is completed. With this configuration, the user D is predicted to reach the multifunction peripheral 100 when an expected completion time point Pc of the print job (time point PtD at which the take-away time CT4 of the user D has elapsed since the time point Pn at which the job completion notification is transmitted) is reached.

When the job completion notification is thus transmitted to the data transmission source before the completion of the print job, an error may occur after the job completion notification is transmitted to the data transmission source. Also in this case, the main control unit 110 instructs the communication unit 120 to transmit the error occurrence notification to another user (additional notification destination) as well as to the data transmission source.

When an error occurs after the job completion notification is transmitted to the data transmission source, the main control unit 110 sets a time (corresponding to "predetermined time" according to the present disclosure) obtained by subtracting a time between the time point at which the job completion notification is transmitted and a time point at which the error occurs from the take-away time of the user of the data transmission source, as the remaining time. Further, the main control unit 110 extracts the user who has a shorter take-away time than the remaining time set when the error occurs (time obtained by subtracting the time between the time point at which the job completion notification is transmitted and the time point at which the error occurs from the take-away time of the user of the data transmission source) as the additional notification destination candidate. When such an additional notification destination candidate exists, the communication unit 120 sets any one of the users among the additional notification destination candidates as the additional notification destination, and transmits the error occurrence notification to the additional notification destination as well. For example, the communication unit 120 sets the user having the shortest take-away time among the additional notification destination candidates as the additional notification destination.

Further, when the take-away time of the user of the additional notification destination has elapsed since the error occurrence notification is transmitted to the additional notification destination without the error elimination operation being conducted, the main control unit 110 calculates the time obtained by subtracting the take-away time of the user of the additional notification destination from the remaining time set when the error occurs (in this case, corresponding to the time obtained by subtracting the time between the time point at which the job completion notification is transmitted and the time point at which the error occurs from the take-away time of the user of the data transmission source), as the remaining time. Further, the main control unit 110 extracts the user who has a shorter take-away time than the remaining time (time obtained by subtracting the take-away time of the user of the additional notification destination from the remaining time set when the error occurs) and who is not set as the additional notification destination, as the additional notification destination candidate. Then, the main control unit 110 instructs the communication unit 120 to set a new additional notification destination and transmit the error occurrence notification to the new additional notification destination.

In addition, when the take-away time of the user of the new additional notification destination has elapsed since the error occurrence notification is transmitted to the new additional notification destination without the error elimination operation being conducted, the main control unit 110 instructs the communication unit 120 to repeatedly set a new additional notification destination and transmit the error occurrence notification to the new additional notification destination. At this time, the main control unit 110 sets the time obtained by subtracting the total time of the take-away times of the respective users that have already been set as the additional notification destinations from the remaining time set when the error occurs (in this case, corresponding to the time obtained by subtracting the time between the time point at which the job completion notification is transmitted and the time point at which the error occurs from the take-away time of the user of the data transmission source), as the remaining time. Further, the main control unit 110 extracts the user who has a shorter take-away time than the remaining time (time obtained by subtracting the total time of the take-away times of the respective users that have already been set as the additional notification destinations from the remaining time set when the error occurs) and who is not set as the additional notification destination, as the additional notification destination candidate.

For example, in the example shown in FIG. 3 and illustrated in. FIG. 5, assuming that a time point at which 0.3 minute has elapsed since the time point Pn at which the job completion notification is transmitted to the user D is the time point Per at which the error occurs, the remaining time calculated by the main control unit 110 becomes 1.2 minutes (CT4−Ti). In this case, among the users A to C and E, the users A to C have a shorter take-away time than the remaining time. Therefore, the main control unit 110 extracts the users A to C as the additional notification destination candidates. Then, the user having the shortest take-away time among the additional notification destination candidates is the user A, and hence the communication unit 120 sets the user A as the additional notification destination. That is, the communication unit 120 transmits the error occurrence notification to the user A as well as to the user D at the time point Per at which the error occurs. With this configuration, the user A is predicted to reach the multifunction peripheral 100 when the time point PtA, at which the take-away time CT1 of the user A has elapsed since the time point Per at which the error occurs, is reached.

Further, when the error elimination operation is not conducted even at the time point PtA, the remaining time set by the main control unit 110 becomes 1.0 minute (CT4−Ti−CT1). In this case, among the users B, C, and E, the users B and C have a shorter take-away time than the remaining time. Therefore, the main control unit 110 extracts the users B and C as the additional notification destination candidates. Then, the user having the shortest take-away time among the additional notification destination candidates is the user B, and hence the communication unit 120 sets the user B as a new additional notification destination. That is, the communication unit 120 transmits the error occurrence notification to the user B at the time point PtA. With this configuration, the user B is predicted to reach the multifunction peripheral 100 when the time point PtB, at which the take-away time CT2 of the user B has elapsed since the time point PtA, is reached.

Further, when the error elimination operation is not conducted even at the time point PtB, the remaining time set by the main control unit 110 becomes 0.4 minute (CT4−Ti−CT1−CT2). In this case, each of the take-away times CT3 and CT5 of the users C and E remaining without having been set as the additional notification destination is longer than the remaining time. For that reason, the communication unit 120 does not transmit the error occurrence notification at the time point PtB. When there remains a user who has a shorter take-away time than the remaining time and who is not set as the additional notification destination, any one of the remaining users is set as a new additional notification destination, and the error occurrence notification is transmitted to the new additional notification destination.

<Flow of Control Conducted when Error Occurs>

Figure 6:
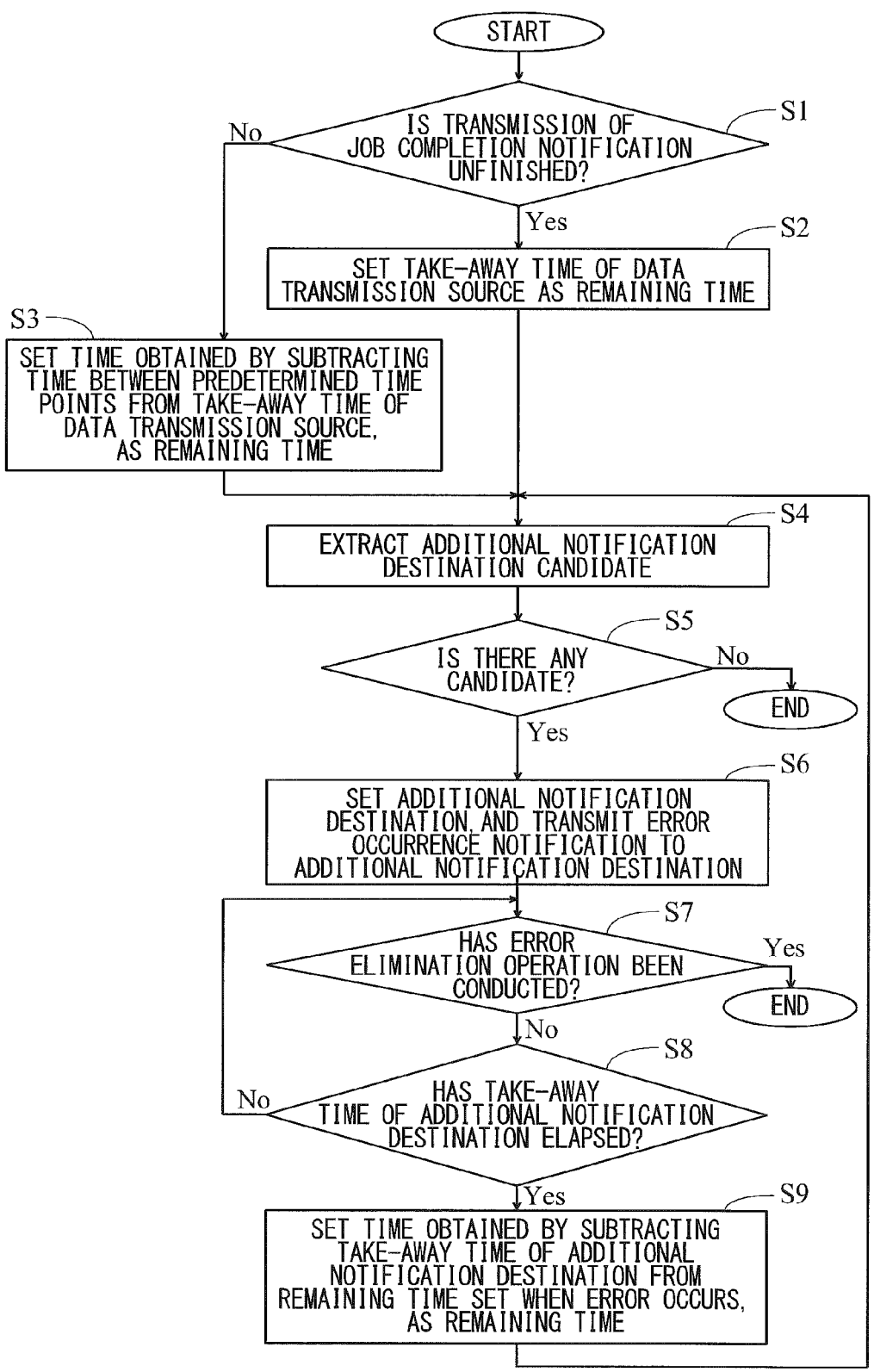
FIG. 6 is a flowchart for illustrating a flow of control conducted when an error occurs during execution of a print job in the multifunction peripheral according to the embodiment of the present disclosure.

Now, with reference to FIG. 6, a description is made of a flow of control conducted when an error occurs during the execution of the print job. It is assumed that the print job is being executed at a start point of a flowchart of FIG. 6. When an error occurs during the execution of the print job, the flowchart of FIG. 6 is started. Note that, when an error occurs during the execution of the print job, the main control unit 110 instructs the communication unit 120 to transmit the error occurrence notification to the data transmission source.

In Step S1, the main control unit 110 determines whether or not the time point at which the error occurs is a time point before the job completion notification is transmitted to the data transmission source. When Step S1 results in that the time point at which the error occurs is the time point before the job completion notification is transmitted to the data transmission source, the procedure advances to Step S2, and when the time point at which the error occurs is a time point after the job completion notification is transmitted to the data transmission source, the procedure advances to Step S3.

When the procedure advances to Step S2, the main control unit 110 sets the take-away time of the user of the data transmission source as the remaining time. Further, when the procedure advances to Step S3, the main control unit 110 sets a time obtained by subtracting a time between predetermined time points (time between the time point at which the job completion notification is transmitted and the time point at which the error occurs) from the take-away time of the user of the data transmission source, as the remaining time. Then, the procedure advances to Step S4.

When the procedure advances to Step S4, the main control unit 110 extracts the user who has a shorter take-away time than the remaining time set when the error occurs as the additional notification destination candidate. Then, in Step S5, the main control unit 110 determines whether or not there exists an additional notification destination candidate. As a result, when there exists an additional notification destination candidate, the procedure advances to Step S6, and when there exists no additional notification destination candidate, this flow is brought to an end.

When the procedure advances to Step S6, the main control unit 110 instructs the communication unit 120 to set the user having the shortest take-away time among the additional notification destination candidates as the additional notification destination, and to transmit the error occurrence notification to the additional notification destination. After that, in Step S7, the main control unit 110 detects whether or not the error elimination operation has been conducted for the multifunction peripheral 100. When Step S7 results in that the error elimination operation has been conducted for the multifunction peripheral 100, this flow is brought to an end. On the other hand, when Step S7 results in that the error elimination operation has not been conducted for the multifunction peripheral 100, the procedure advances to Step S8.

When the procedure advances to Step S8, the main control unit 110 determines whether or not the take-away time of the user of the additional notification destination has elapsed since the error occurrence notification is transmitted to the additional notification destination. When Step S8 results in that the take-away time of the user of the additional notification destination has elapsed, the procedure advances to Step S9, and when the take-away time of the user of the additional notification destination has not been elapsed, the procedure returns to Step S7.

When the procedure advances to Step S9, the main control unit 110 sets the time obtained by subtracting the take-away time of the user of the additional notification destination (when there are a plurality of users that have already been set as the additional notification destinations, total time of the respective take-away times of the plurality of users) from the remaining time set when the error occurs, as the remaining time. Then, the procedure returns to Step S4.

As described above, the multifunction peripheral 100 (image forming apparatus) according to this embodiment includes: the printing unit 2 configured to execute the print job for printing the image on the paper P based on the print data, and suspend, when an error occurs during the execution of the print job, the print job until the error is eliminated; the ejection tray 21 configured to receive ejection of the printed paper PP on which the image has been printed by the printing unit 2; the main control unit 110 (ejection detection unit) configured to detect whether or not the printed paper PP has been taken away from the ejection tray 21 based on the output from the ejection detection sensor ES configured to change the output depending on whether the printed paper PP is present or absent on the ejection tray 21; the communication unit 120 configured to receive the print data, transmit the job completion notification indicating the completion of the print job to the data transmission source that is the transmission source of the print data, and transmit, when an error occurs during the execution of the job, the error occurrence notification to the data transmission source; and the storage section 113 configured to store, for each user, the take-away time which is a time set based on the time that is required after the communication unit 120 transmits the job completion notification to the data transmission source until the main control unit 110 detects that the printed paper PP has been taken away and which is the time required after the user of the data transmission source receives the job completion notification until the user takes away the printed paper PP. When an error occurs during the execution of the print job, the communication unit 120 sets a user who has a shorter take-away time than the user of the data transmission source as the additional notification destination candidate, sets any one of the users among the additional notification destination candidates as the additional notification destination, and transmits the error occurrence notification to the additional notification destination as well as to the data transmission source. In addition, when the take-away time of the user of the additional notification destination has elapsed since the error occurrence notification is transmitted to the additional notification destination without the error elimination operation, which is an operation for eliminating the error, being conducted, the communication unit 120 sets a user who has a shorter take-away time than the time obtained by subtracting the take-away time of the user of the additional notification destination from the take-away time of the user of the data transmission source and who is not set as the additional notification destination, as the additional notification destination candidate, sets any one of the users among the additional notification destination candidates as a new additional notification destination, and transmits the error occurrence notification to the new additional notification destination.

With the configuration of this embodiment, when an error occurs during the execution of the print job, the error occurrence notification is transmitted to the additional notification destination as well as to the data transmission source, to thereby cause the user of the additional notification destination to recognize that the error elimination operation is required, and cause the user of the additional notification destination to move toward the multifunction peripheral 100. In this case, the take-away time of the user set as the additional notification destination is shorter than the take-away time of the user of the data transmission source, and hence after the user of the additional notification destination starts to move toward the multifunction peripheral 100 when receiving the error occurrence notification, the user of the additional notification destination reaches the multifunction peripheral 100 earlier than the user of the data transmission source. For that reason, when the error occurrence notification is transmitted to the additional notification destination as well, a timing to start the error elimination operation becomes earlier than in the case where the error occurrence notification is transmitted to only the data transmission source, and hence the error is eliminated quickly. This allows a period during which the print job is in a stopped state (period during which the print job is not executable) to be reduced even when an error occurs during the execution of the print job to stop the print job in execution, which improves the user's convenience.

In addition, when the take-away time of the user of the additional notification destination has elapsed since the error occurrence notification is transmitted to the additional notification destination without the error elimination operation being conducted, the transmission of the error occurrence notification to the new additional notification destination causes the user of the new additional notification destination to move toward the multifunction peripheral 100. In this case, any one of the users who have a shorter take-away time than the time obtained by subtracting the take-away time of the user of the additional notification destination from the take-away time of the user of the data transmission source and who are not set as the additional notification destination is set as the additional notification destination. For that reason, after the user of the new additional notification destination starts to move toward the multifunction peripheral 100 when receiving the error occurrence notification, the user of the new additional notification destination reaches the multifunction peripheral 100 earlier than the user of the data transmission source, and the error elimination operation is started by the user of the new additional notification destination. This allows the period during which the print job is in a stopped state (period during which the print job is not executable) to be inhibited from becoming long even when the user set earlier as the additional notification destination does not move toward the multifunction peripheral 100.

Further, in this configuration, the user capable of reaching the multifunction peripheral 100 earlier than the user of the data transmission source is set as the additional notification destination, which allows the inhibition of such inconvenience that the user of the data transmission source has already started the error elimination operation when the user of the additional notification destination reaches the multifunction peripheral 100. That is, this configuration allows an action of the user of the additional notification destination to be inhibited from becoming wasteful.

Further, in this embodiment, as described above, when the take-away time of the user of the new additional notification destination has elapsed since the error occurrence notification is transmitted to the new additional notification destination without the error elimination operation being conducted, the communication unit 120 sets the user who has a shorter take-away time than the time obtained by subtracting the total time of the take-away times of the respective users that have already been set as the additional notification destinations from the take-away time of the user of the data transmission source and who is not set as the additional notification destination, as the additional notification destination candidate, and repeatedly sets a new additional notification destination and transmits the error occurrence notification to the new additional notification destination. According to this configuration, even when the error elimination operation is not conducted by the user of the new additional notification destination, in a case where the user capable of reaching the multifunction peripheral 100 earlier than the user of the data transmission source remains other than the user who has already been set as the additional notification destination, the remaining user may be caused to move toward the multifunction peripheral 100.

Further, in this embodiment, as described above, the communication unit 120 transmits the job completion notification to the unset user for whom the take-away time is not set when the print job based on the print data received from the unset user is completed. Then, each time the printed paper PP is taken away after the completion of the print job based on the print data received from the unset user, the main control unit 110 (take-away time setting unit) acquires the time between the time point at which the job completion notification is transmitted to the unset user and the time point at which the printed paper PP is detected to have been taken away, as the setting-purpose time. When the number of acquired setting-purpose times corresponding to the unset user reaches the predetermined number, the main control unit 110 sets the average time obtained by averaging the predetermined number of setting-purpose times as the take-away time of the unset user. Alternatively, the main control unit 110 sets the shortest setting-purpose time among the predetermined number of setting-purpose times as the take-away time of the unset user. According to this configuration, the take-away time of each user is set based on a time that was actually required after the job completion notification is transmitted until the printed paper PP is taken away, which allows the take-away time of each user to be inhibited from becoming incorrect. Further, from a viewpoint of the user, his/her own take-away time is automatically set, and hence there is no need for an operation such as registration of his/her own take-away time, which is excellent in convenience.

Further, in this embodiment, as described above, when the number of acquired setting-purpose times reaches the predetermined number, the main control unit 110 obtains the absolute value of the deviation of the setting-purpose time, and inhibits the setting-purpose time having the absolute value of the deviation exceeding the threshold value defined in advance from being used to set the take-away time. According to this configuration, the setting-purpose time having the absolute value of the deviation exceeding the threshold value is allowed to be excluded when the take-away time is set based on the predetermined number of setting-purpose times, which allows the take-away time to be further inhibited from becoming incorrect.

Further, in this embodiment, as described above, when the communication unit 120 receives the print data, the main control unit 110 (time prediction unit) predicts the expected job execution time which is required after start of the print job based on the print data until completion thereof. In the case where the take-away time of the user of the data transmission source is shorter than the expected job execution time, the communication unit 120 transmits the job completion notification to the data transmission source when the time obtained by subtracting the take-away time of the user of the data transmission source from the expected job execution time has elapsed since the print job is started. In this manner, with the configuration for transmitting the job completion notification to the user of the data transmission source before the completion of the print job, when an error occurs after the job completion notification is transmitted to the user of the data transmission source, the user of the data transmission source is already moving toward the multifunction peripheral 100 at the time point at which the error occurs, which allows advancement of a timing for the user of the data transmission source to start the error elimination operation. Note that, when an error does not occur after the job completion notification is transmitted to the user of the data transmission source, the user of the data transmission source reaches the multifunction peripheral 100 at substantially the same timing as the completion of the print job. That is, such inconvenience that the print job continues without having been completed even after the user of the data transmission source reaches the multifunction peripheral 100 is not caused.

Further, in this embodiment, as described above, when an error occurs after the job completion notification is transmitted to the data transmission source, the communication unit 120 sets the user who has a shorter take-away time than the predetermined time that is the time obtained by subtracting the time between the time point at which the job completion notification is transmitted and the time point at which the error occurs from the take-away time of the user of the data transmission source, as the additional notification destination candidate, sets any one of the users among the additional notification destination candidates as the additional notification destination, and transmits the error occurrence notification to the additional notification destination as well. In addition, when the take-away time of the user of the additional notification destination has elapsed since the error occurrence notification is transmitted to the additional notification destination without the error elimination operation being conducted, the communication unit 120 sets the user who has a shorter take-away time than the time obtained by subtracting the take-away time of the user of the additional notification destination from the predetermined time (time obtained by subtracting the time between the time point at which the job completion notification is transmitted and the time point at which the error occurs from the take-away time of the user of the data transmission source) and who is not set as the additional notification destination, as the additional notification destination candidate, sets any one of the users among the additional notification destination candidates as a new additional notification destination, and transmits the error occurrence notification to the new additional notification destination.

Further, in the case where an error occurs after the job completion notification is transmitted to the data transmission source, when the take-away time of the user of the new additional notification destination has elapsed since the error occurrence notification is transmitted to the new additional notification destination without the error elimination operation being conducted, the communication unit 120 sets the user who has a shorter take-away time than the time obtained by subtracting the total time of the take-away times of the respective users that have already been set as the additional notification destinations from the predetermined time (time obtained by subtracting the time between the time point at which the job completion notification is transmitted and the time point at which the error occurs from the take-away time of the user of the data transmission source) and who is not set as the additional notification destination, as the additional notification destination candidate, and repeatedly sets a new additional notification destination and transmits the error occurrence notification to the new additional notification destination.

According to this configuration, when an error occurs during the execution of the print job, the user capable of reaching the multifunction peripheral 100 earlier than the user of the data transmission source who is already moving toward the multifunction peripheral 100 at the time point at which the error occurs may be caused to move toward the multifunction peripheral 100.

Further, in this embodiment, as described above, the communication unit 120 sets the user having the shortest take-away time among the additional notification destination candidates as the additional notification destination. According to this configuration, the user capable of reaching the multifunction peripheral 100 earliest among the additional notification destination candidates is set as the additional notification destination, which further advances the timing for the user of the additional notification destination to start the error elimination operation.

Further, as described above, this embodiment includes the power supply unit 130 configured to supply power to the power-supplied unit 140 of the multifunction peripheral 100 by normally supplying power to the power-supplied unit 140 in the normal mode and restricting the power supply to the power-supplied unit 140 in the power-saving mode compared to the normal mode. The power supply unit 130 shifts the power supply mode from the normal mode to the power-saving mode when the print job is completed, and continues the power supply in the normal mode when the print job stops due to the error that has occurred during the execution of the print job. In the multifunction peripheral 100 provided with such power supply modes, a power-saving effect deteriorates unless the error that has occurred during the execution of the print job is eliminated quickly. Therefore, in the configuration according to this embodiment, when an error occurs during the execution of the print job, the error occurrence notification is transmitted to the additional notification destination (including the new additional notification destination) as well. Accordingly, the timing to start the error elimination operation is advanced, and hence the error is allowed to be eliminated quickly, which allows the power-saving effect to be inhibited from deteriorating.

It should be understood that the embodiment disclosed herein is shown for an illustrative purpose in all respects and is not limitative. The scope of the present disclosure is not shown by the above description of the embodiment but by the claims, and further, incorporates all modifications within the spirit and scope equivalent to those of the claims.

What is claimed is:
1. An image forming apparatus used by a plurality of users, comprising:
   a printing unit configured to:
      execute a print job for printing an image on paper based on print data; and
      suspend, when an error occurs during execution of the print job, the print job until the error is eliminated;
   an ejection tray configured to receive ejection of printed paper on which the image has been printed by the printing unit;
   an ejection detection unit configured to detect whether or not the printed paper has been taken away from the ejection tray based on an output from an ejection detection sensor configured to change the output depending on whether the printed paper is present or absent on the ejection tray;
   a communication unit configured to:
      receive the print data;
      transmit a job completion notification indicating completion of the print job to a data transmission source that is a transmission source of the print data; and
      transmit, when the error occurs during the execution of the print job, an error occurrence notification to the data transmission source; and
   a storage unit configured to store, for each of the plurality of users, a take-away time which is a time set based on a time that is required after the communication unit transmits the job completion notification to the data transmission source until the ejection detection unit detects that the printed paper has been taken away and which is a time required after a user of the data transmission source receives the job completion notification until the user takes away the printed paper, wherein:

the communication unit is further configured to, when the error occurs during the execution of the print job:

set a user who has a shorter take-away time than the user of the data transmission source as an additional notification destination candidate;

set any one of the users among the additional notification destination candidates as an additional notification destination; and transmit the error occurrence notification to the additional notification destination as well as to the data transmission source; and the communication unit is further configured to, when the take-away time of the user of the additional notification destination has elapsed since the error occurrence notification is transmitted to the additional notification destination without an error elimination operation, which is an operation for eliminating the error, being conducted:

set a user who has a shorter take-away time than a time obtained by subtracting the take-away time of the user of the additional notification destination from the take-away time of the user of the data transmission source and who is not set as the additional notification destination, as the additional notification destination candidate;

set any one of the users among the additional notification destination candidates as a new additional notification destination; and transmit the error occurrence notification to the new additional notification destination.

2. An image forming apparatus according to claim 1, wherein the communication unit is further configured to, when the take-away time of the user of the new additional notification destination has elapsed since the error occurrence notification is transmitted to the new additional notification destination without the error elimination operation being conducted:

set a user who has a shorter take-away time than a time obtained by subtracting a total time of the take-away times of the respective users that have already been set as the additional notification destinations from the take-away time of the user of the data transmission source and who is not set as the additional notification destination, as the additional notification destination candidate; and repeatedly set the new additional notification destination and transmit the error occurrence notification to the new additional notification destination.

3. An image forming apparatus according to claim 1, further comprising a take-away time setting unit configured to set the take-away time for each user, wherein:

the communication unit is further configured to transmit, when the print job based on the print data received from an unset user for whom the take-away time is not set is completed, the job completion notification to the unset user; and the take-away time setting unit is further configured to:
acquire, each time the printed paper is taken away after the completion of the print job based on the print data received from the unset user, a time between a time point at which the job completion notification is transmitted to the unset user and a time point at which the printed paper is detected to have been taken away, as a setting-purpose time; and set, when a number of acquired setting-purpose times corresponding to the unset user reaches a predetermined number, an average time obtained by averaging the predetermined number of setting-purpose times as the take-away time of the unset user, or set a shortest setting-purpose time among the predetermined number of setting-purpose times as the take-away time of the unset user.

4. An image forming apparatus according to claim 3, wherein the take-away time setting unit is further configured to:

obtain, when the number of acquired setting-purpose times reaches the predetermined number, an absolute value of a deviation of the setting-purpose time; and inhibit the setting-purpose time having the absolute value of the deviation exceeding a threshold value defined in advance from being used to set the take-away time.

5. An image forming apparatus according to claim 1, further comprising a time prediction unit configured to predict, when the communication unit receives the print data, an expected job execution time which is required after start of the print job based on the print data until completion of the print job, wherein the communication unit is further configured to transmit the job completion notification to the data transmission source, in a case where the take-away time of the user of the data transmission source is shorter than the expected job execution time, when a time obtained by subtracting the take-away time of the user of the data transmission source from the expected job execution time has elapsed since the print job is started.

6. An image forming apparatus according to claim 5, wherein:

the communication unit is further configured to, when the error occurs after the job completion notification is transmitted to the data transmission source:

set a user who has a shorter take-away time than a predetermined time that is a time obtained by subtracting a time between a time point at which the job completion notification is transmitted and a time point at which the error occurs from the take-away time of the user of the data transmission source, as the additional notification destination candidate;

set any one of the users among the additional notification destination candidates as the additional notification destination; and transmit the error occurrence notification to the additional notification destination as well; and the communication unit is further configured to, when the take-away time of the user of the additional notification destination has elapsed since the error occurrence notification is transmitted to the additional notification destination without the error elimination operation being conducted:

set a user who has a shorter take-away time than a time obtained by subtracting the take-away time of the user of the additional notification destination from the predetermined time and who is not set as the additional notification destination, as the additional notification destination candidate;

set any one of the users among the additional notification destination candidates as the new additional notification destination; and transmit the error occurrence notification to the new additional notification destination.

7. An image forming apparatus according to claim 6, wherein the communication unit is further configured to, when the take-away time of the user of the new additional notification destination has elapsed since the error occurrence notification is transmitted to the new additional notification destination without the error elimination operation being conducted:

set a user who has a shorter take-away time than a time obtained by subtracting a total time of the take-away times of the respective users that have already been set as the additional notification destinations from the predetermined time and who is not set as the additional notification destination, as the additional notification destination candidate; and repeatedly set the new additional notification destination and transmit the error occurrence notification to the new additional notification destination.

8. An image forming apparatus according to claim 1, wherein the communication unit is further configured to set the user having a shortest take-away time among the additional notification destination candidates as the additional notification destination.

9. An image forming apparatus according to claim 1, further comprising a power supply unit configured to supply power to a power-supplied unit of the image forming apparatus by normally supplying power to the power-supplied unit in a normal mode and restricting power supply to the power-supplied unit in a power-saving mode compared to the normal mode, wherein the power supply unit is further configured to:
conduct a shift from the normal mode to the power-saving mode when the print job is completed; and
continue the power supply in the normal mode when the print job stops due to the error that has occurred during the execution of the print job.

* * * * *